United States Patent
Tabuchi et al.

(10) Patent No.: US 7,742,690 B2
(45) Date of Patent: Jun. 22, 2010

(54) IMAGING APPARATUS AND METHOD FOR PROCESSING IMAGING RESULTS

(75) Inventors: Tatsuhito Tabuchi, Chiba (JP); Takeshi Harada, Tokyo (JP); Yuji Saitou, Tokyo (JP); Kenji Tsushio, Chiba (JP); Atsushi Okumura, Tokyo (JP); Tetsuji Ogata, Tokyo (JP)

(73) Assignee: Sony Corporation (JP)

( * ) Notice: Subject to any disclaimer, the term of this patent is extended or adjusted under 35 U.S.C. 154(b) by 584 days.

(21) Appl. No.: 11/398,318

(22) Filed: Apr. 5, 2006

(65) Prior Publication Data
US 2006/0251409 A1    Nov. 9, 2006

(30) Foreign Application Priority Data
Apr. 7, 2005    (JP)    ............................. 2005-110461

(51) Int. Cl.
*G03B 17/00*    (2006.01)
(52) U.S. Cl. ...................... 396/52; 348/208.6
(58) Field of Classification Search ................. 396/52; 348/208.6
See application file for complete search history.

(56) References Cited

U.S. PATENT DOCUMENTS

| | | | | |
|---|---|---|---|---|
| 2002/0054211 | A1* | 5/2002 | Edelson et al. | 348/169 |
| 2002/0145669 | A1* | 10/2002 | Umeda et al. | 348/220.1 |
| 2003/0193610 | A1* | 10/2003 | Nozaki et al. | 348/345 |
| 2006/0026524 | A1* | 2/2006 | Ma et al. | 715/713 |
| 2006/0098967 | A1 | 5/2006 | Togawa | |

FOREIGN PATENT DOCUMENTS

| | | | |
|---|---|---|---|
| JP | 2-117276 | A | 5/1990 |
| JP | 3-093369 | A | 4/1991 |
| JP | 4-002281 | A | 1/1992 |
| JP | 4-163535 | A | 6/1992 |
| JP | 4-170163 | A | 6/1992 |
| JP | 9182019 | A | 7/1997 |
| JP | 10-079881 | A | 3/1998 |
| JP | 2003-023600 | A | 1/2003 |
| JP | 2003078807 | A | 3/2003 |
| JP | 2003078808 | A | 3/2003 |
| JP | 2004229084 | A | 8/2004 |
| WO | 2004109386 | | 12/2004 |

OTHER PUBLICATIONS

Takahashi (JP Publication No. 2003-134389), Sep. 5, 2003, "Digital Still Camera", translation provided.*
Office Action from corresponding Chinese application.

* cited by examiner

*Primary Examiner*—Rodney E Fuller
*Assistant Examiner*—Fang-Chi Chang
(74) *Attorney, Agent, or Firm*—Lerner, David, Littenberg, Krumholz & Mentlik, LLP

(57) ABSTRACT

An imaging apparatus for recording an imaging result on a recording medium includes an imaging device operable to obtain an imaging result; an optical system operable to form an optical image on an imaging plane of the imaging device; a first motion detector operable to detect a movement of the imaging apparatus and to output a detection result; and a recorder operable to record the imaging result, together with the detection result, on the recording medium.

16 Claims, 8 Drawing Sheets

IMAGING APPARATUS AND METHOD FOR PROCESSING IMAGING RESULTS

CROSS-REFERENCE TO RELATED APPLICATIONS

The present application claims priority from Japanese Patent Application No. JP 2005-110461 filed on Apr. 7, 2005, the disclosure of which is hereby incorporated by reference herein.

BACKGROUND OF THE INVENTION

The present invention relates to imaging apparatuses, such as digital video cameras, and methods for processing imaging results. More particularly, the invention relates to an imaging apparatus and a method for processing imaging results, in which imaging results can be processed on the basis of information concerning the motion of the imaging apparatus obtained by a motion detector, such as an angular velocity sensor or an acceleration sensor, so that subjects can be detected by easily and reliably even if a background is moving due to panning or tilting, and as a result, various processing operations can be performed.

In some known recording/playback devices, such as optical disc drives, representative images are generated by detecting scene changes so that operations for locating the heads of scenes are simplified based on the representative images. A typical method for detecting scene changes is disclosed in, for example, Japanese Unexamined Patent Application Publication No. 9-182019. In this method, motions of frames are detected by using a motion-vector detecting technique, and representative images are generated on the basis of motion detection results. Accordingly, scene changes can be reliably detected even if images are faded in or out.

Some of the recording/playback devices process moving picture files captured by an imaging apparatus, and have a function of correcting motion blurring based on detection results obtained from a motion detector, such as an acceleration sensor or an angular velocity sensor. Methods for processing imaging results obtained from imaging apparatuses, such as monitoring cameras, by using various motion vectors have also been proposed. More specifically, subjects, such as human beings, are detected from imaging results by using motion vectors, and the detected subjects are traced.

In known methods for detecting subjects by using motion vectors, it is difficult to easily and reliably detect subjects if a background is moving due to panning or tilting.

Accordingly, it is desirable to provide an imaging apparatus and a method for processing imaging results, in which various processing operations can be performed by easily and reliably detecting subjects even if a background is moving due to panning or tilting.

SUMMARY OF THE INVENTION

According to an embodiment of the present invention, there is provided an imaging apparatus for recording an imaging result on a recording medium, including an imaging device for obtaining an imaging result; an optical system for forming an optical image on an imaging plane of the imaging device; first motion detection means for detecting a movement of the imaging apparatus and for outputting a detection result; and recording means for recording the imaging result, together with the detection result, on the recording medium.

With this configuration, when playing back the imaging result recorded on the recording medium, the movement of the imaging apparatus can be detected from the detection result recorded on the recording medium to detect the movement of a background. Accordingly, the movements of the individual parts of the imaging result can be corrected using the movement of the background so that the relative movements of the individual parts with respect to a background can be detected. Thus, even if the background is moving due to panning or tilting, the movement of the subject can be detected, assuming that the background is still. As a result, the subject can be easily and reliably detected, and various operations can be executed.

According to another embodiment of the present invention, there is provided an imaging apparatus for obtaining an imaging result, including an imaging device for obtaining an imaging result; an optical system for forming an optical image on an imaging plane of the imaging device; first motion detection means for detecting a movement of the imaging apparatus and for outputting a detection result; second motion detection means for detecting movements of individual parts of the imaging result; and motion correction means for correcting the movements of the individual parts of the imaging result using the detection result to detect relative movements of the individual parts of the imaging result with respect to a background.

According to another embodiment of the present invention, there is provided a method for processing an imaging result obtained from an imaging apparatus that records the imaging result on a recording medium, the method including detecting a movement of the imaging apparatus and outputting a detection result; and recording the detection result, together with the imaging result, on the recording medium.

According to another embodiment of the present invention, there is provided a method for processing an imaging result obtained from an imaging apparatus, the method including detecting a movement of the imaging apparatus and outputting a detection result; detecting movements of individual parts of the imaging result; and correcting the movements of the individual parts of the imaging result using the detection result to detect relative movements of the individual parts of the imaging result with respect to a background.

According to an embodiment of the present invention, even if a background is moving due to panning or tilting, a subject can be detected easily and reliably, and various operations can be performed.

DETAILED DESCRIPTION

Embodiments of the present invention are described in detail below with reference to the accompanying drawings.

First Embodiment

Figure 2:
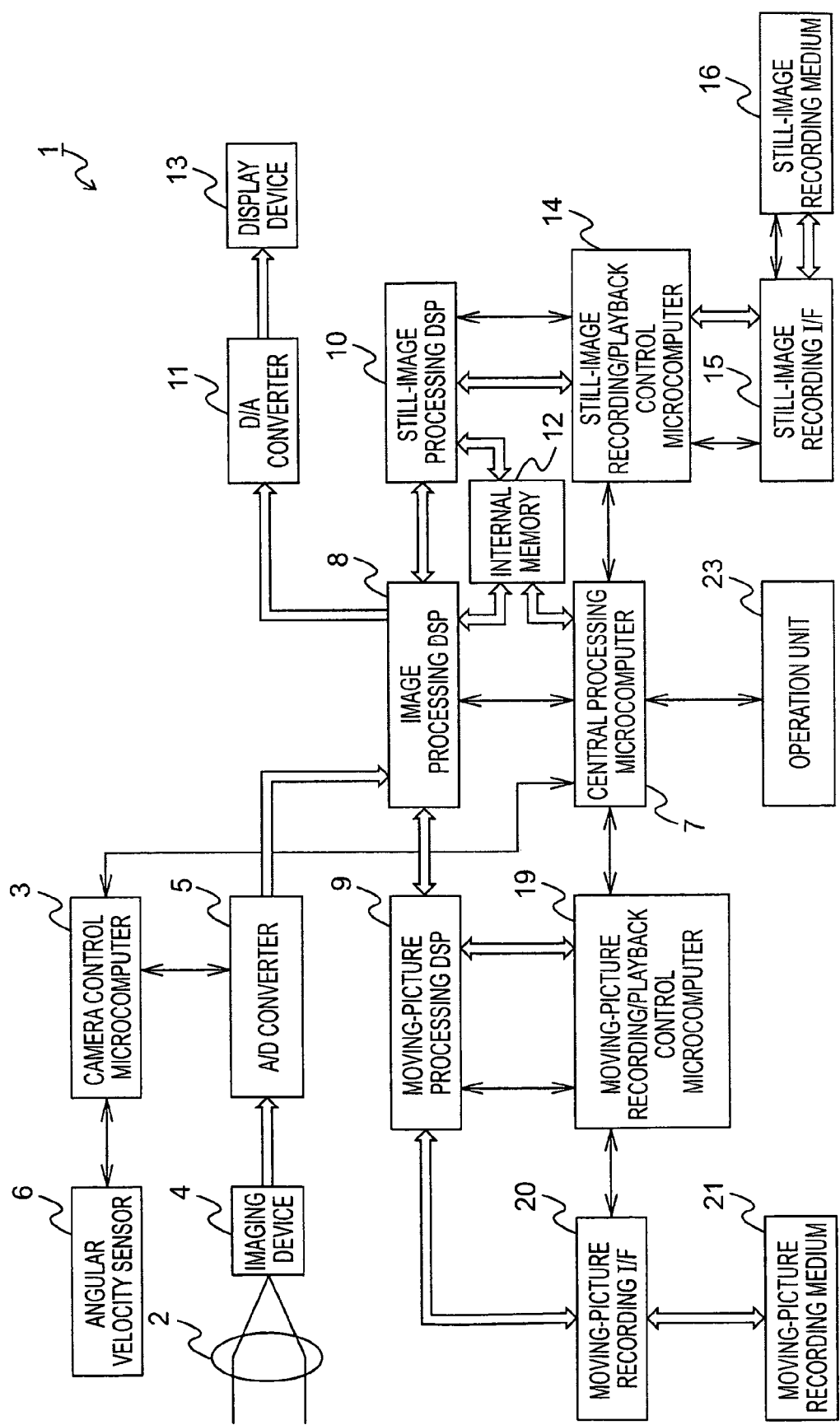
FIG. 2 is a block diagram illustrating the imaging apparatus of the first embodiment of the present invention.

FIG. 2 is a block diagram illustrating an imaging apparatus 1 according to a first embodiment of the present invention. The imaging apparatus 1, which is a digital video camera, records imaging results of moving pictures and still images on a recording medium or plays back the imaging results recorded on the recording medium in response to an operation from a user.

In the imaging apparatus 1, a lens 2 condenses light to form an optical image on the imaging plane of an imaging device 4 by varying the magnifying power or the focus under the control of a camera control microcomputer 3.

The imaging device 4 includes a charge-coupled device (CCD) solid-state imaging element, a complementary metal oxide semiconductor (CMOS) solid-state imaging element, etc., and photoelectrically converts optical images formed on the imaging plane to output imaging results of moving pictures or still images. In the first embodiment, the lens 2 forms an optical system for forming optical images on the imaging plane of the imaging device 4.

An analog-to-digital (A/D) converter 5 conducts A/D conversion on the imaging results output from the imaging device 4 to output the digital image data. In this processing, when converting an imaging result of a moving picture into image data, the A/D converter 5 segments a partial area of the image corresponding to the imaging result and converts the segmented area into image data while changing the partial area to be segmented under the control of the camera control microcomputer 3.

An angular velocity sensor 6, which is, for example, a gyrosensor, detects angular velocities of the imaging apparatus 1 in various directions to supply information concerning the detected angular velocities.

The camera control microcomputer 3 changes the magnifying power of the lens 2 in response to an instruction from a central processing microcomputer 7, and also changes the focus and the diaphragm of the lens 2 based on information concerning focus control and diaphragm control detected by an image processing digital signal processor (image processing DSP) 8. In response to an instruction to correct the imaging result for motion blurring from the central processing microcomputer 7, the camera control microcomputer 3 calculates a displacement of the imaging result caused by motion blurring on the basis of the angular velocities detected by the angular velocity sensor 6 and the magnifying power of the lens 2, and controls the timing of the A/D converter 5 so that the displacement of the imaging result can be corrected. With this configuration, the imaging apparatus 1 can output moving-picture image data in which motion blurring is corrected. Instead of the angular velocity sensor 6, a triaxial acceleration sensor may be used for correcting imaging results for motion blurring. Also, instead of segmenting a partial area of an image corresponding to an imaging result, an optical system may be used for executing control to correct the imaging result for motion blurring.

In the first embodiment, the camera control microcomputer 3 and the A/D converter 5 form motion-blurring correction means for correcting an imaging result for motion blurring based on a detection result obtained from the angular velocity sensor 6. The angular velocity sensor 6 forms motion detection means for detecting the motion of the imaging apparatus 1.

The camera control microcomputer 3 detects the motion of the imaging apparatus 1 by subtracting a displacement of the imaging result caused by motion blurring from the amount of change in the frames of the imaging result, which is detected based on the angular velocities obtained from the angular velocity sensor 6 and the magnifying power of the lens 2, and supplies the detection result to the central processing microcomputer 7. In the recording of moving pictures, if there is no instruction to correct the imaging result for motion blurring from the central processing microcomputer 7, the camera control microcomputer 3 directly supplies the amount of change in the frames detected based on the angular velocities and the magnifying power of the lens 2 as the result of detecting the motion of the imaging apparatus 1. In this case, the amount of change in the frames may be informed to the central processing microcomputer 7 in the form of the number of pixels corresponding to the number of samples in the A/D converter 5 associated with the displacement of the imaging result caused by motion blurring. Alternatively, the amount of change in the frames may be informed in the form of the angular velocities detected by the angular velocity sensor 6 or the magnifying power of the lens 2. With this configuration, the displacement of a background due to panning or tilting can be detected by the central processing microcomputer 7.

The image processing DSP 8 switches their operations under the control of the central processing microcomputer 7. More specifically, when recording imaging results, the image processing DSP 8 receives image data from the A/D converter 5 and performs white balance adjustment, gamma adjustment, knee processing, etc., on the imaging data, and also obtains information necessary for focus adjustment and diaphragm adjustment and supplies the information to the camera control microcomputer 3. The image processing DSP 8 also outputs the image data concerning moving pictures to a moving picture processing DSP 9, and the image data concerning still images to a still-image processing DSP 10, and also outputs the moving-picture image data and the still-image data to a digital-to-analog (D/A) converter 11.

When playing back imaging results, the image processing DSP 8 supplies moving-picture image data and the still-image data output from the moving-picture processing DSP 9 and still-image processing DSP 10, respectively, to the D/A converter 11. During the playback operation, when outputting the moving-picture image data from the moving-picture processing DSP 9 to the D/A converter 11, the image processing DSP 8 executes processing on the imaging result by using an internal memory 12 in response to an instruction from the central processing microcomputer 7, which is discussed below.

The D/A converter 11 conducts. D/A conversion on the moving-picture image data and the still-image data output from the image processing DSP 8 to output a video signal. A display device 13, which is a flat display device, such as a liquid crystal display device, displays the image in accordance with the video signal output from the D/A converter 11.

In the imaging apparatus 1 configured as described above, imaging results obtained by the imaging device 4 can be monitored on the display device 13, and also, moving-picture image data and still-image data reflecting the imaging results are processed in the moving-picture processing DSP 9 and the still-image processing DSP 10, respectively, and are recorded. Additionally, image data output from the moving-picture processing DSP 9 and the still-image processing DSP 10 can be monitored on the display device 13, in other words, the imaging results recorded as moving pictures and still images can be monitored.

The still-image processing DSP 10 switches their operations under the control of a still-image recording/playback control microcomputer 14. More specifically, when recording still-image imaging results, the still-image processing DSP 10 compresses the image data output from the image processing DSP 8 by using the internal memory 12 according to a moving picture experts group (MPEG) method to generate coded data, and outputs the coded data to the still-image recording/playback control microcomputer 14. Additionally, when playing back still images, the still-image processing DSP 10 decompresses coded data output from the still-image recording/playback control microcomputer 14 to output the decompressed data to the image processing DSP 8.

The still-image recording/playback control microcomputer 14 switches their operations under the control of the central processing microcomputer 7 to control the operations of the still-image processing DSP 10 and a still-image recording interface 15. More specifically, when recording still images, the still-image recording/playback control microcomputer 14 supplies coded data output from the still-image processing DSP 10 to the still-image recording interface 15 and records the coded data on a still-image recording medium 16. The still-image recording/playback control microcomputer 14 also plays back various data recorded on the still-image recording medium 16 via the still-image recording interface 15 and supplies the played-back still images to the central processing microcomputer 7. When playing back still images, the still-image recording/playback control microcomputer 14 plays back image data of a target file from the still-image recording medium 16 via the still-image recording interface 15.

The still-image recording interface 15 is an input/output interface for the still-image recording medium 16. The still-image recording medium 16 is a recording medium, such as a memory card or a magnetic disk, which can be installed and removed into and from the imaging apparatus 1. The still-image recording medium 16 records various data output from the still-image recording interface 15 or plays back various data recorded on the still-image recording medium 16. Thus, in the imaging apparatus 1 configured as described above, still-image imaging results are recorded or played back by using the still-image recording medium 16.

The moving-picture processing DSP 9 switches their operations under the control of a moving-picture recording/playback control microcomputer 19. More specifically, when recording moving pictures, the moving-picture processing DSP 9 compresses image data output from the image processing DSP 8 by an MPEG method to generate coded data, and outputs the coded data to a moving-picture recording interface 20 under the control of the moving-picture recording/playback control microcomputer 19. The moving-picture processing DSP 9 also outputs various data associated with the coded data to the moving-picture recording/playback control microcomputer 19. Additionally, when playing back moving pictures, the moving-picture processing DSP 9 decompresses coded data output from the moving-picture recording interface 20 based on various data associated with coded data output from the moving-picture recording/playback control microcomputer 19, and outputs the decompressed data to the image processing DSP 8.

The moving-picture recording interface 20 is an input/output interface for a moving-picture recording medium 21. The moving-picture recording medium 21 is a recording medium, such as a memory card, a magnetic disk, or an optical disc, which can be installed and removed into and from the imaging apparatus 1. The moving-picture recording medium 21 records various data output from the moving-picture recording interface 20 or plays back data recorded on the moving-picture recording medium 21.

The moving-picture recording/playback control microcomputer 19 switches their operations under the control of the central processing microcomputer 7 to control the operations of the moving-picture processing DSP 9 and the moving-picture recording interface 20. Thus, in the imaging apparatus 1 configured as described above, moving-picture imaging results can be recorded or played back by using the moving-picture recording medium 21.

An operation unit 23 supplies information concerning operations performed on a touch panel or various operators disposed on the imaging apparatus 1 to the central processing microcomputer 7. The central processing microcomputer 7, which is a computer controlling the overall operation of the imaging apparatus 1, executes a processing program recorded on a memory (not shown) to control the operations of the individual elements of the imaging apparatus 1 on the basis of the information concerning the operations performed on the touch panel and the various operators supplied from the operating unit 23. Although in this embodiment the processing program has been installed in the imaging apparatus 1, it may be downloaded via a network, such as the Internet, or may be recorded on a recording medium, such as an optical disc or a magnetic disk.

The central processing microcomputer 7 powers on the imaging apparatus 1 in response to the operation performed on the power source by the user. The central processing microcomputer 7 also controls the overall operation in response to the operation from the user so that moving-picture image data and still-image data can be obtained and recorded on the moving-picture recording medium 21 and the still-image recording medium 16, respectively. When recording moving-picture image data on the moving-picture recording medium 21, the central processing microcomputer 7 outputs the motion detection result of the imaging apparatus 1 contained in the imaging result and obtained from the camera control microcomputer 3 to the moving-picture recording/playback control microcomputer 19, and also records the motion detection result, together with the moving-picture image data, on the moving-picture recording medium 21. In the imaging apparatus 1 configured as described above, the amount of motion of a background generated by panning or tilting can be recorded and is used for various purposes when playing back the image data. If the moving-picture recording medium 21 is an optical disc, such as a digital versatile disc (DVD), the amount of motion is probably recorded in a predetermined area of, for example, a video object unit (VOB). More specifically, the amount of motion can be recorded in an additional recording information pack (ARI PCK). The additional recording information pack is one type of pack, which can store additional information, forming the video object unit. The video object unit includes a video pack for storing video data, a sound pack for storing sound data, etc. in addition to the additional recording information pack. Accordingly, in the first embodiment, the moving-picture recording interface 20 forms recording means for recording motion detection results detected by the camera control microcomputer 3, together with imaging results, on the moving-picture recording medium 21, and also forms playback means for playing back motion detection results, together with imaging results, recorded on the moving-picture recording medium 21.

In response to an instruction to play back imaging results from the user, the central processing microcomputer 7 controls the operations of the individual elements of the imaging apparatus 1 so that still images recorded on the still-image recording medium 16 and moving pictures recorded on the moving-picture recording medium 21 can be played back and displayed on the display device 13.

Figure 1:
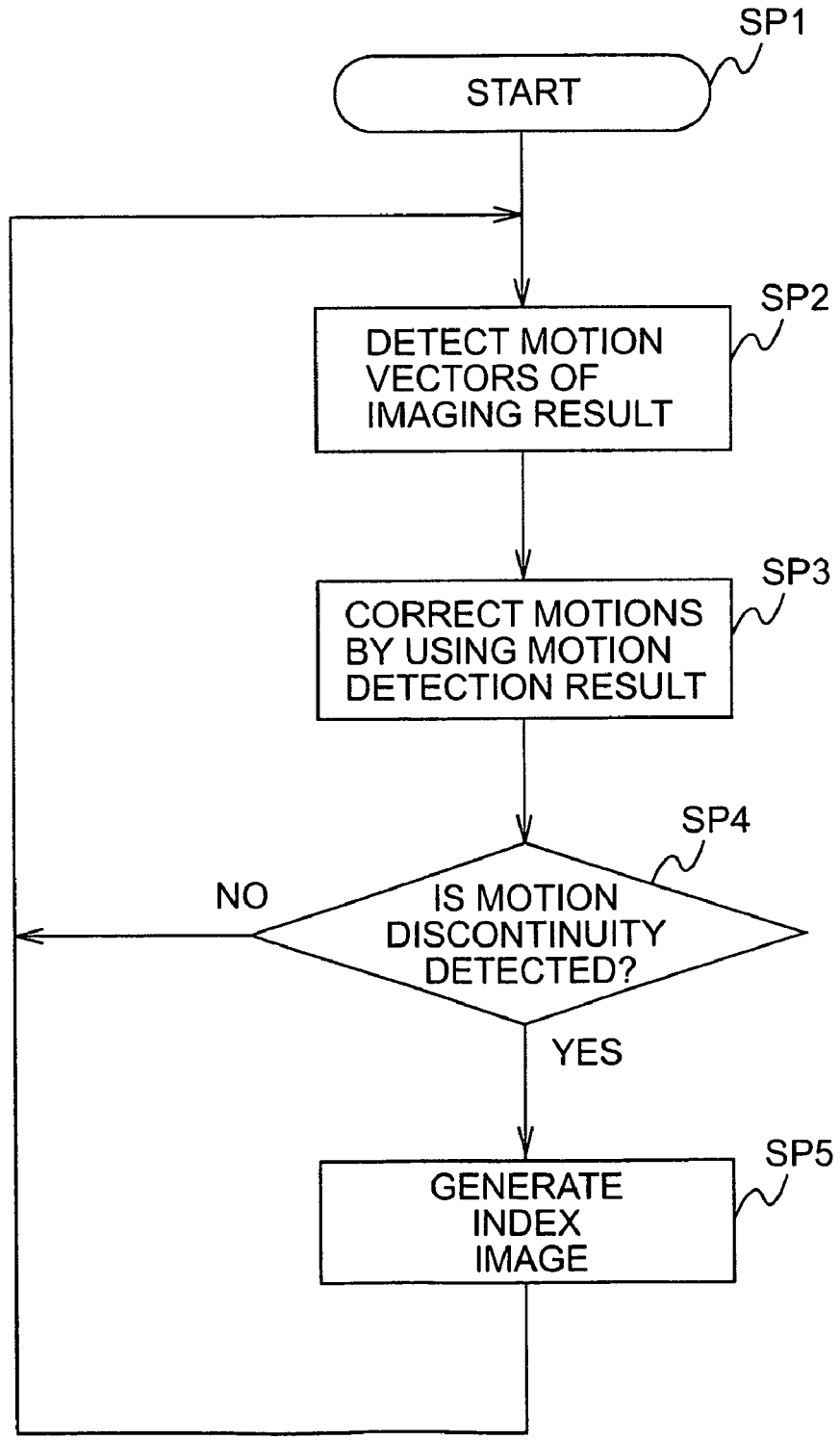
FIG. 1 is a flowchart illustrating the processing performed by a central processing microcomputer of an imaging apparatus according to a first embodiment of the present invention.

In response to an instruction from the user to generate index images used for locating the heads of scenes during the playback operation, index images are sequentially generated by detecting scene changes according to the processing indicated by the flowchart in FIG. 1.

More specifically, the central processing microcomputer 7 proceeds from step SP1 to SP2 in FIG. 1. In step SP2, the central processing microcomputers 7 controls the overall operation so that the imaging results recorded on the moving-picture recording medium 21 are sequentially played back. More specifically, the central processing microcomputer 7 controls the moving-picture processing DSP 9 to decompress the imaging results and also instructs the image processing DSP 8 to process the imaging results decompressed by the moving-picture processing DSP 9. The image processing DSP 8 then sequentially detects motion vectors from the imaging results played back from the moving-picture recording medium 21 in units of macroblocks, and supplies information concerning the detected motion vectors to the central processing microcomputer 7. Accordingly, in the first embodiment, the image processing DSP 8 forms motion detection means for detecting motions of the individual parts of imaging results played back from a recording medium. If motion vectors are detected by reducing the number of samples of the imaging results, processing may be simplified if necessary, for example, motion vectors are discretely detected for every predetermined number of macroblocks.

Figure 3:
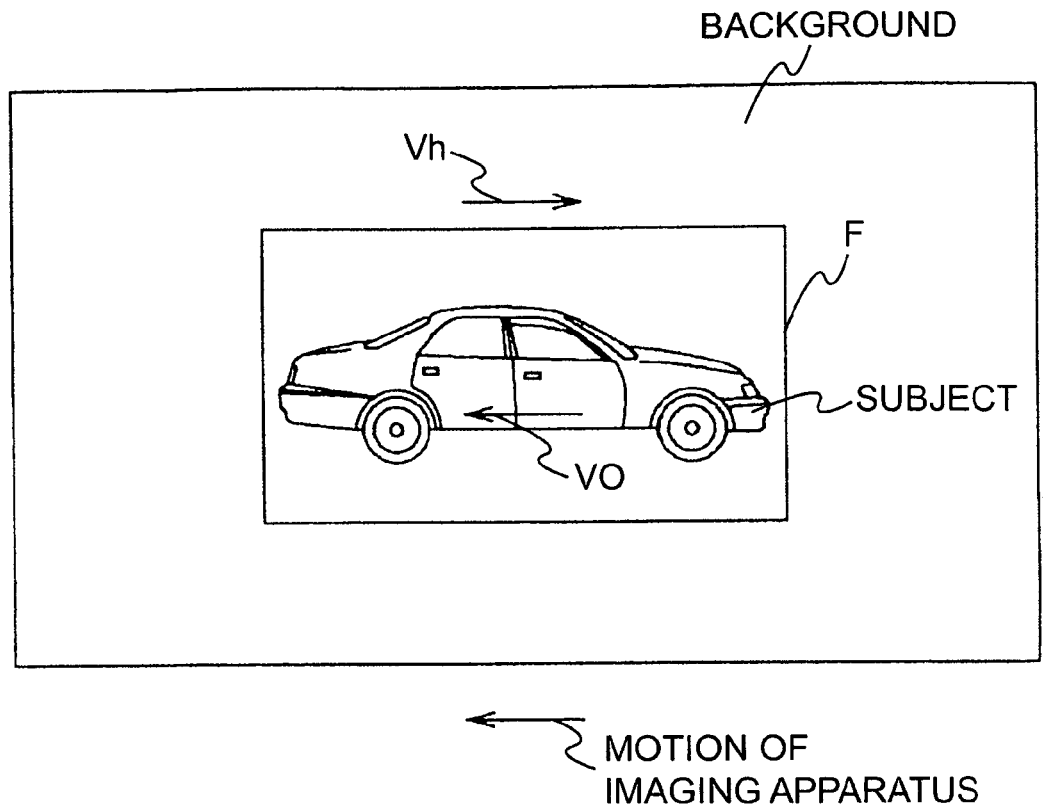
FIG. 3 is a plan view illustrating an example of the relative motion obtained as a result of the processing shown in FIG. 1.

In this manner, the central processing microcomputer 7 sequentially detects the motions of the individual parts of the imaging result recorded on the moving-picture recording medium 21. Then, in step SP3, the central processing microcomputer 7 subtracts the motion detection result played back from the moving-picture recording medium 21 from the motion vectors detected by the image processing DSP 8. The motion detection results recorded on the moving-picture recording medium 21 represent the motion of the imaging apparatus 1. Accordingly, after removing the motion detection result, the resulting motion represents a motion Vh in a still background, as shown in FIG. 3. Thus, the central processing microcomputer 7 corrects the motions of the individual parts of the imaging result detected by the image processing DSP 8 by using the motion detection result played back from a recording medium, and then detects the relative motions of the individual parts of the imaging results with respect to the still background. With this configuration, when, for example, the imaging apparatus 1 is panning to trace the motion of a vehicle, as shown in FIG. 3, the motion of the background becomes almost 0, and the motion VO of the vehicle is detected. Thus, the motion of a subject as if it were moving in a still background is detected.

The central processing microcomputer 7 accumulatively adds, in units of frames, the relative motions of the individual parts with respect to the still background, and calculates the differences in the frames (inter-frame differences), thereby detecting a change in the amount of motions between the frames. The central processing microcomputer 7 determines whether the differences between the frames are greater than a predetermined threshold to detect frames having discontinuous motions, thereby locating the heads of scenes. When accumulatively adding the motions in units of frames, the relative motions of the individual parts of the imaging result may be converted into absolute values before being added. Alternatively, only specific sampling points, for example, parts having the largest motion, may be accumulatively added. Additionally, a sharp change of motions may be detected based on the previous inter-frame difference or based on whether the difference in continuous frames can be approximated by a linear curve or a quadratic curve.

Then, the central processing microcomputer 7 determines in step SP4 whether a discontinuity of motions is detected. If a discontinuity is not found in step SP4, the process returns to step SP2. If a discontinuity is found in step SP4, the process proceeds to step SP5. In step SP5, the central processing microcomputer 7 controls the overall operation so that the detected head frame of a scene change can be recorded on the moving-picture recording medium 21 in the form of a thumbnail image in association with the time information concerning the original moving-picture file, thereby generating an index image. Then, the central processing microcomputer 7 returns to step SP2 and starts processing the subsequent frame.

In the imaging apparatus 1, a list of the generated index images is displayed on the display device 13, and in response to the selection of an index image from the user, the moving-picture file recorded on the moving-picture recording medium 21 can be played back from the head of the recording position of the selected index image. Thus, in the imaging apparatus 1, a series of processing for the playback operation by the user can be simplified.

In the first embodiment, the central processing microcomputer 7 forms image processing means for generating index thumbnail images based on a change in relative motions of the individual parts of an imaging result with respect to a background.

In response to an instruction to perform zoom processing for a image file from the user, the central processing microcomputer 7 controls the overall operation so that the moving-picture files specified by the user are sequentially played back from the recording medium 21 and are displayed on the display device 13. In this processing, in a manner similar to the generation of index images, relative motions of the individual parts of the imaging result with respect to the background are detected so that a subject in the imaging result is detected from the motion distribution in each frame. Then, the central processing microcomputer 7 gives an instruction to perform an electronic zoom operation so that the detected subject can be segmented in the form of a rectangular shape and is displayed on the entire screen of the display device 13.

Figure 4:
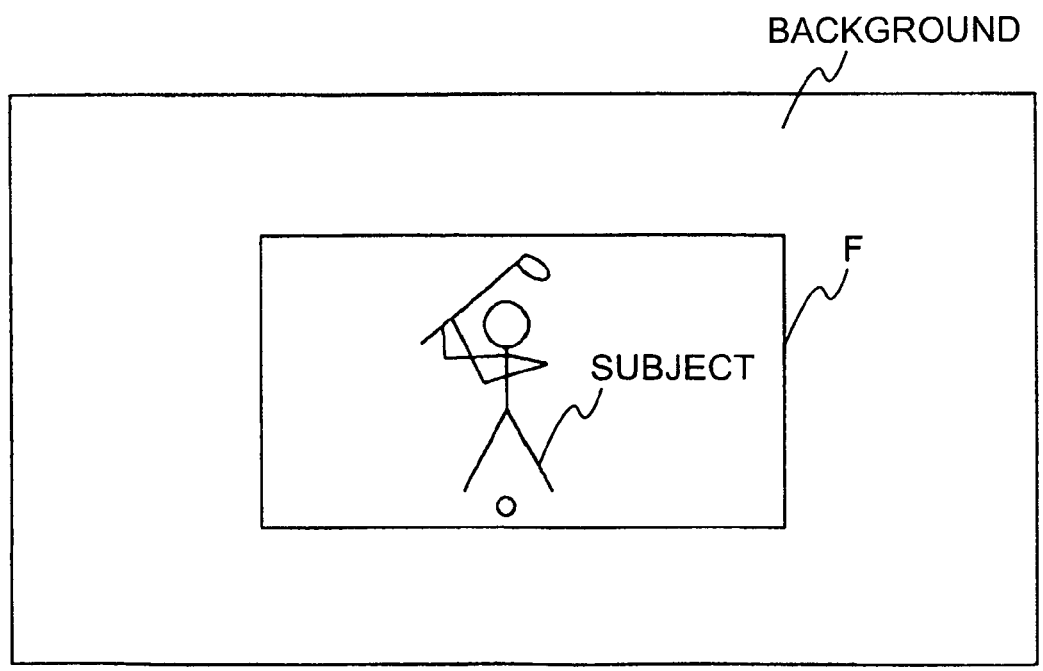
FIG. 4 is a plan view illustrating another example of the relative motion obtained as a result of the processing shown in FIG. 1.

For example, in FIG. 3, when a moving vehicle is photographed, the body of the vehicle continues the same motion. In contrast, the motion of the tires is detected by the superposition of the rotation of the tires on the motion of the vehicle. The motion of the background is almost 0. In FIG. 4, when a golfer is photographed in the front, a large motion of a golf club is found, and the motion of the golfer is found in accordance with the motion of the golf club. The motion of the background is also almost 0.

If an instruction to perform an electronic zoom operation on a subject is issued from the user, the central processing microcomputer 7 determines whether a relative motion in each macroblock is greater than a predetermined threshold to detect macroblocks having motions.

Figure 5:
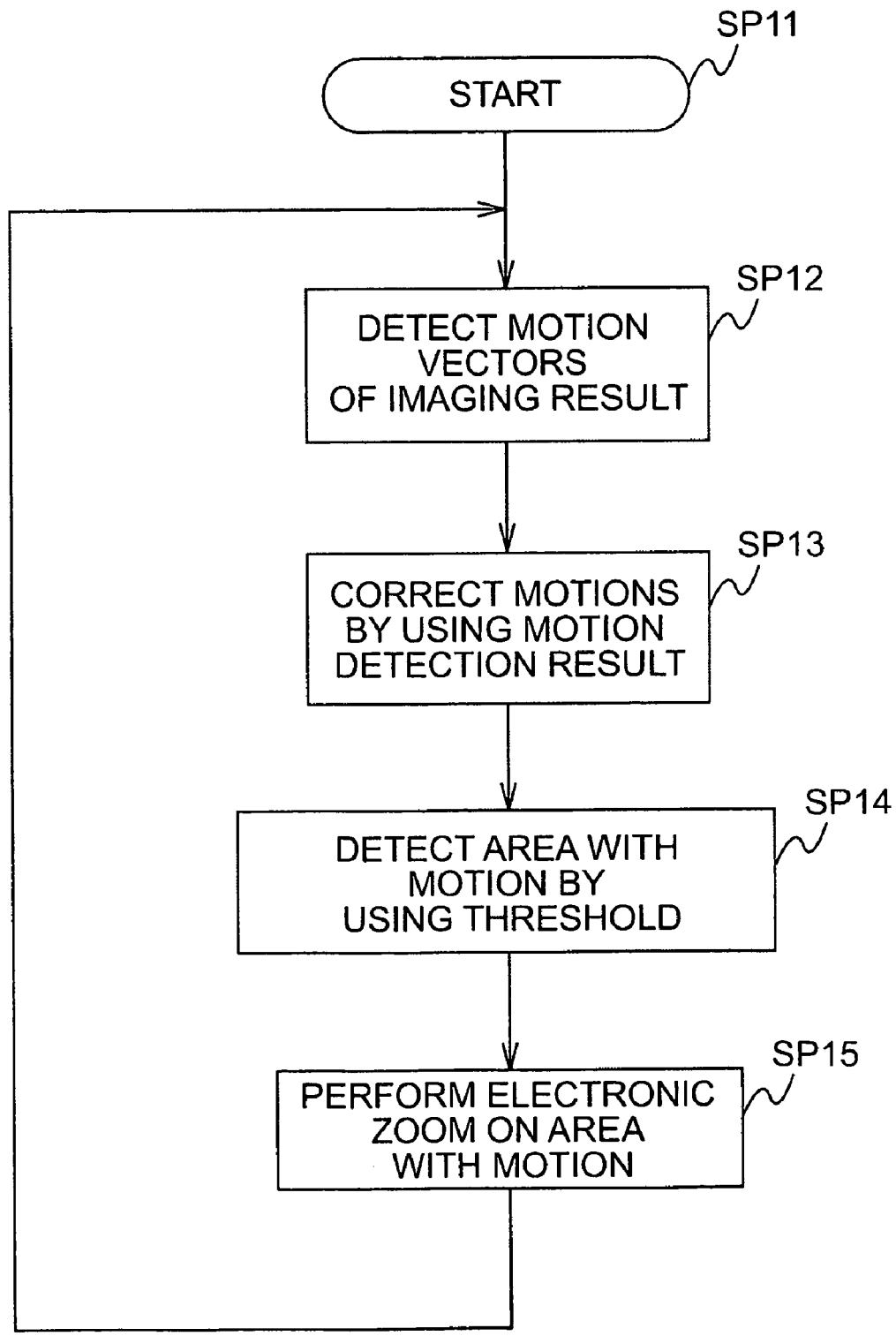
FIG. 5 is a flowchart illustrating an example of the electronic zoom processing performed by the central processing microcomputer.

FIG. 5 illustrates the electronic zoom processing performed by the central processing microcomputer 7. The central processing microcomputer 7 proceeds from step SP11 to SP12 in which the image processing DSP 8 detects a motion vector of each macroblock. Then, in step SP13, the detected motion vector is corrected by using the motion detection result played back from the motion-picture recording medium 21, and then, the relative motions of the individual parts of the imaging result with respect to the background are detected. Then, the central processing microcomputer 7 determines in step SP14 whether the relative motions of the individual parts are greater than a predetermined threshold to detect macroblocks having motions.

In step SP15, the central processing microcomputer 7 instructs the image processing DSP 8 to perform the electronic zoom operation by the aspect ratio of the display screen of the display device 13 so that the left edge and right edge of a macroblock having a motion match the left edge and right edge of the display screen of the display device 13, as indicated by F in FIG. 3, or the upper edge and lower edge of a macroblock having a motion match the upper edge and lower edge of the display screen of the display device 13, as indicated by F in FIG. 4. Then, the central processing microcomputer 7 returns to step SP12 and starts processing the subsequent frame. It is not always necessary that the electronic zoom processing be performed by the aspect ratio of the display screen of the display device 13, nor is it always necessary that the vertical or horizontal dimension of a macroblock having a motion match that of the display screen of the display device 13.

Figure 6:
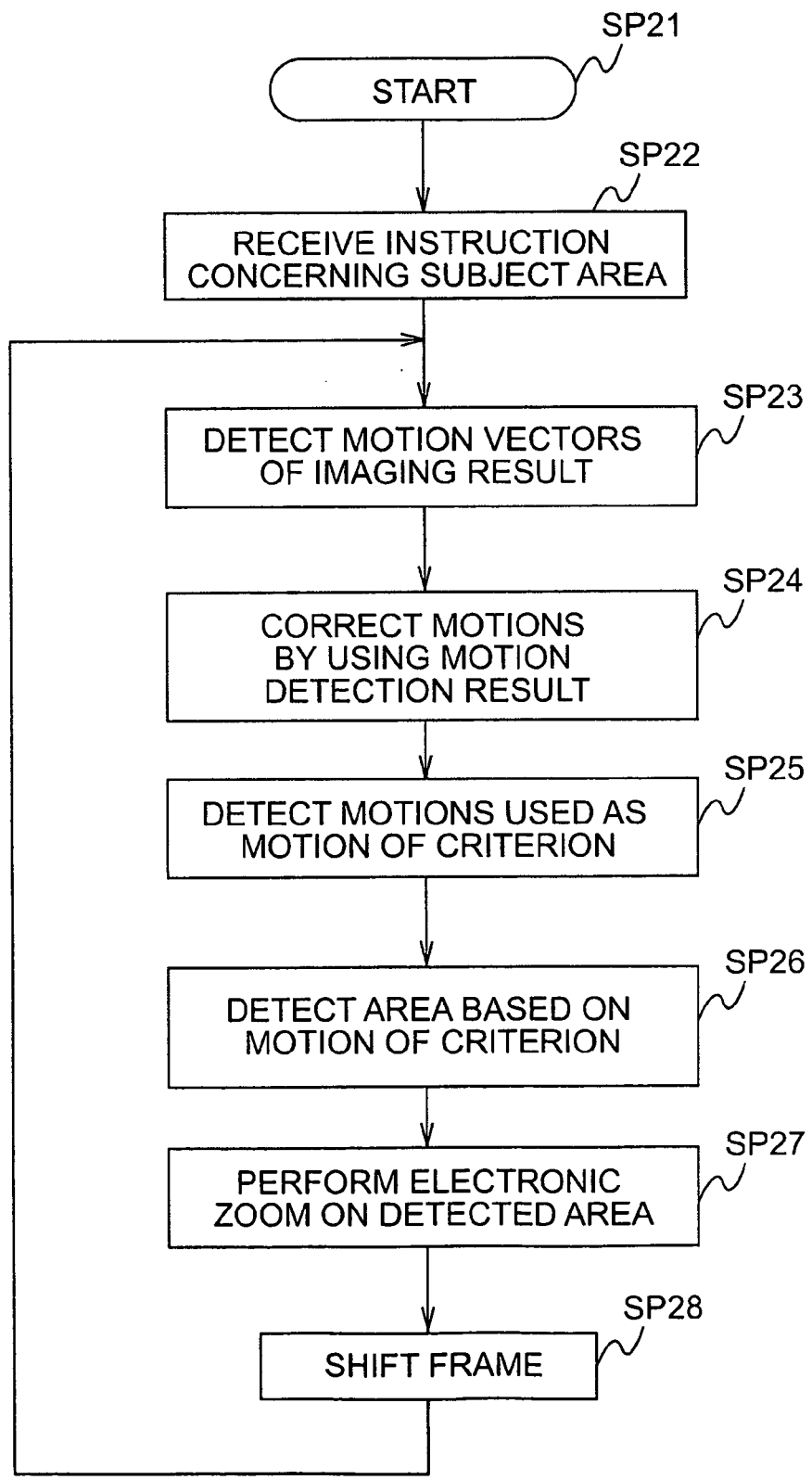
FIG. 6 is a flowchart illustrating another example of the electronic zoom processing performed by the central processing microcomputer.

In response to an instruction to perform an electronic zoom operation on an area specified by the user, the central processing microcomputer 7 executes processing indicated by the flowchart shown in FIG. 6. The central processing microcomputer 7 proceeds from step SP21 to SP22. The central processing microcomputer 7 first displays the head scene of the moving-picture file specified by the user on the display device 13. If an instruction to locate the head of a specific scene is given by the user, the head of that scene is displayed instead of the head scene of the moving-picture file. The central processing microcomputer 7 then receives an instruction concerning a target subject to undergo an electronic zoom operation. For example, the central processing microcomputer 7 receives an instruction by the input of a rectangular area surrounding a subject, as indicated by F in FIG. 7, by operating the touch panel disposed on the display device 13. In this case, an instruction may be given by specifying a point of the subject with a finger, and then, the central processing microcomputer 7 generates a rectangular area around the point specified with the finger and executes the subsequent processing.

Then, in step SP23, the central processing microcomputer 7 instructs the image processing DSP 8 to set the displayed frame as a reference frame and then detects the motion vectors of the subsequent frame. Then, in step SP24, the central processing microcomputer 7 corrects the detected motion vectors by using the motion detection result played back from the moving-picture recording medium 21 to detect the amount of relative motion. Accordingly, the central processing microcomputer 7 can determine, as the relative motions with respect to the background, in which direction the individual parts of the frame displayed on the display device 13 are displaced in the subsequent frame.

Figure 7:
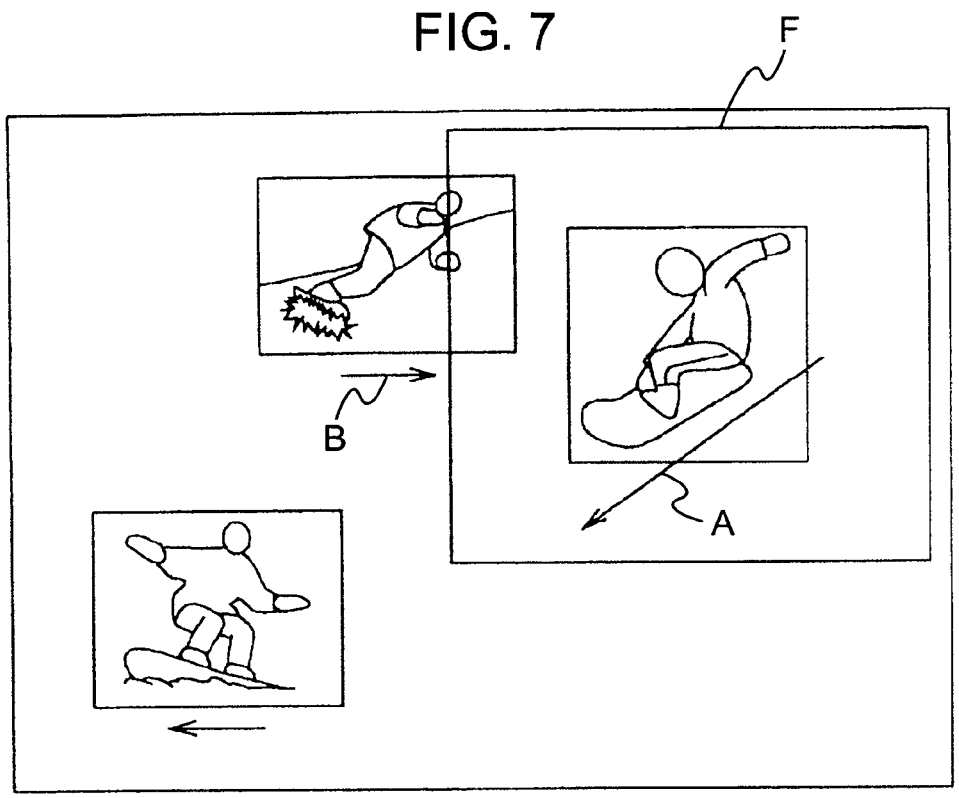
FIG. 7 is a plan view illustrating the setting of an area in the processing shown in FIG. 6.
Figure 8:
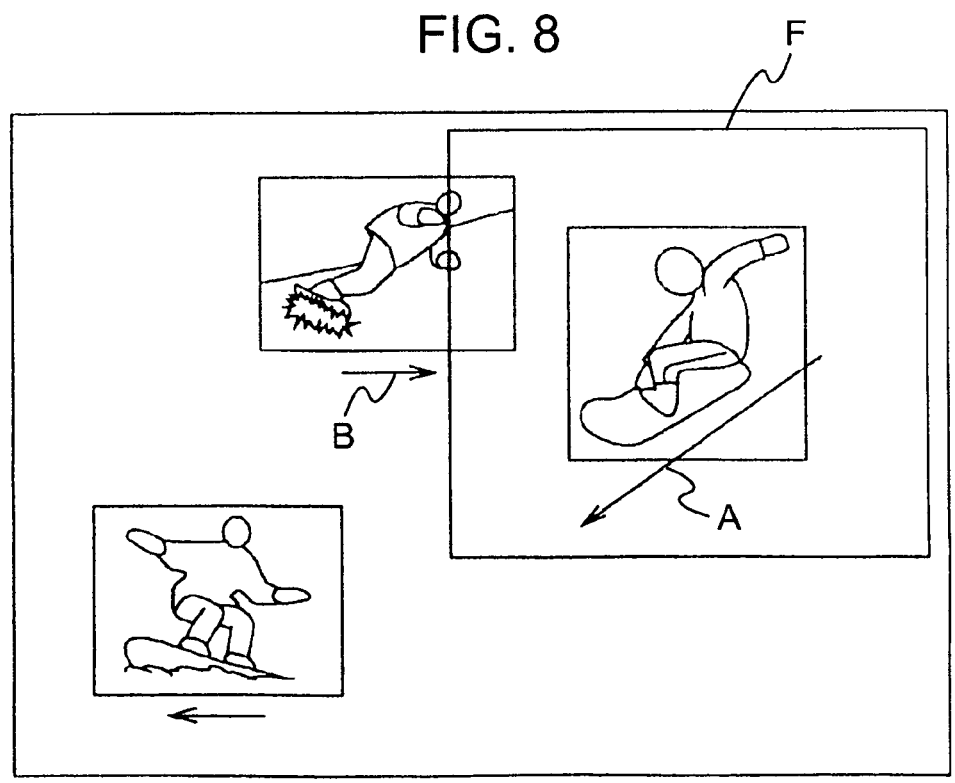
FIG. 8 is a plan view illustrating a relative motion in the processing shown in FIG. 6.

Then, in step SP25, the central processing microcomputer 7 detects the motions of the rectangular area specified by the user from the detected relative motions, and then detects the motion of the subject by statistically processing the motions of the rectangular area. More specifically, when the subject of a specific character is designated by the user from many characters presenting various-motions photographed by the imaging apparatus 1, as shown in FIG. 7, the motion of the character reflects the motion of the macroblock including that character, in which case, it can be determined that the character is moving substantially from the top right to the bottom left, as indicated by the arrow A in FIG. 7. In contrast, another subject contained in the frame F surrounding the above-described target character presents a motion different from the motion of the target character, i.e., the motion from the left to the right as indicated by the arrow B. Accordingly, in step SP25, the central processing microcomputer 7 determines that the largest motion among the relative motions detected in that area as the motion designated by the user, as shown in FIG. 8, and sets the largest motion as the motion of the criterion. Alternatively, there are other approaches to setting the motion of the criterion. For example, motions detected in the area specified by the user are collected according to the direction of the motions, and then, the direction of the motions most frequently detected is determined. Then, the average of the motions in the detected direction is calculated and is used as the motion of the criterion.

Subsequently, in step SP26, the central processing microcomputer 7 determines whether the motion vectors of the individual parts detected in the area specified by the user are similar to the motion of the criterion to detect the area in which the target subject is contained. In this case, macroblocks having a motion similar to the motion of the criterion are detected.

Figure 9:
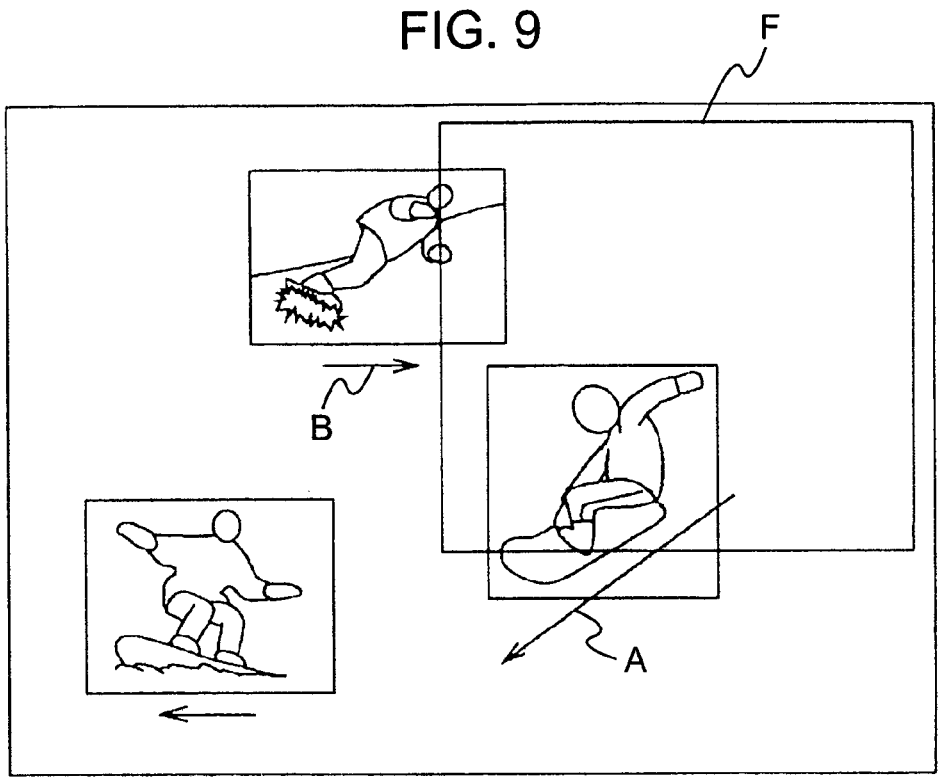
FIG. 9 is a plan view illustrating the detection of a subject in the processing shown in FIG. 6.
Figure 10:
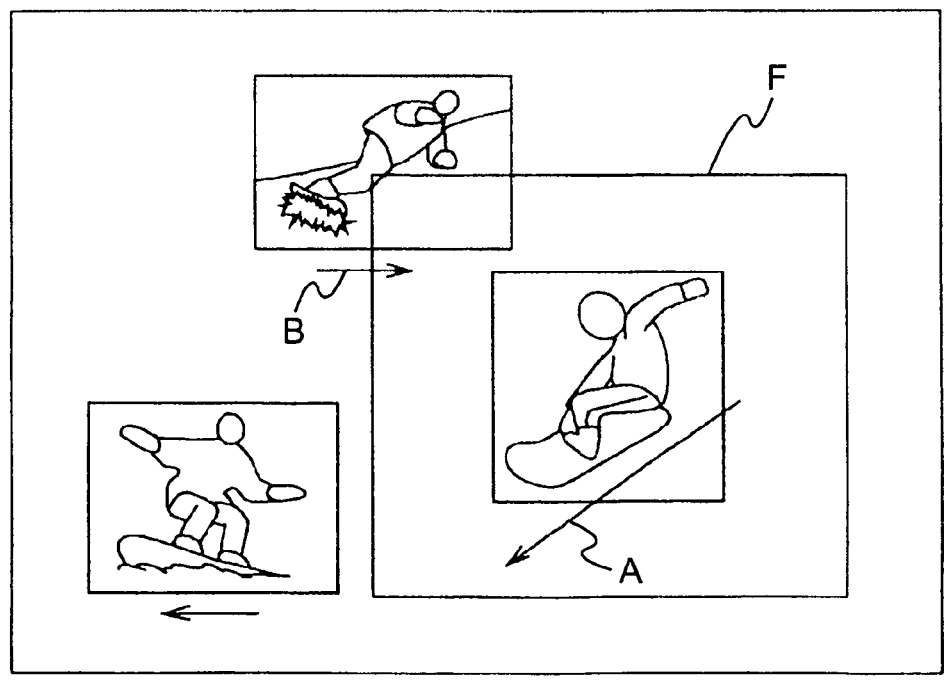
FIG. 10 is a plan view illustrating the shifting of a frame in the processing shown in FIG. 6.

In step SP27, the central processing microcomputer 7 instructs the image processing DSP 8 to perform an electronic zoom operation similar to that described with reference to FIG. 5 on the area detected in step SP26. Then, in step SP28, the central processing microcomputer 7 shifts the frame F, as shown in FIGS. 9 and 10, by an amount of motion represented by the motion of the criterion. In contrast to the detection of the relative motions, the frame F is shifted in the following manner. The motion of the criterion is corrected by using the motion of the background, and then, the actual motion of the imaging result is calculated, and based on the calculated actual motion, the frame F is shifted. As a result, the central processing microcomputer 7 can shift the frame F, as shown in FIG. 10, to the position of the subject predicted in the subsequent frame. The central processing microcomputer 7 then returns to step S23 and starts processing the subsequent frame.

The central processing microcomputer 7 forms subject detection means for detecting an area containing a photographed subject from an imaging result recorded on a recording medium on the basis of the relative motions of the individual parts of the imaging result with respect to the background. The central processing microcomputer 7 also forms image processing means, together with the image processing DSP 8, for generating an image by performing an electronic zoom operation on the area containing the photographed subject on the basis of the detection result obtained from the subject detection means.

The operation of the imaging apparatus 1 configured as described above is as follows.

An optical image formed on the imaging plane of the imaging device 4 by the lens 2 is photoelectrically converted into an imaging result. The imaging result is then converted into digital image data by the A/D converter 5, and the converted image data is then processed by the image processing DSP 8. The processed image data is then converted into an analog signal by the D/A converter 11, and is displayed on the display device 13. As a result, a desired imaging result can be monitored on the display device 13.

While the imaging result is being monitored, if an instruction to obtain a still-image imaging result is issued by operating the operation unit 23 by the user, the operations of the imaging device 4 are switched so that the still-image imaging result is output from the imaging device 4. After the image data corresponding to the still-image imaging result is processed by the image processing DSP 8, it is compressed by the still-image processing DSP 10, and is recorded on the still-image recording medium 16 via the still-image recording/playback control microcomputer 14 and the still-image recording interface 15.

In contrast, when an instruction to record a moving-picture imaging result is issued by the user, the moving-picture image data output from the image processing DSP 8 is sequentially compressed by the moving-picture processing DSP 9, and the resulting coded data is recorded on the moving-picture recording medium 21 via the moving-picture recording interface 20.

As a result, the imaging apparatus 1 can record an imaging result of a desired subject as a still image or a moving picture on the still-image recording medium 16 or the moving-picture recording medium 21, respectively.

When obtaining a moving-picture imaging result, if an instruction to correct motion blurring is issued from the user, motion blurring is corrected based on the timing control on the A/D converter 5 by the camera control microcomputer 3 in accordance with the detection result obtained from the angular velocity sensor 6. In response to an instruction to record a moving-picture imaging result by the user, the detection result obtained from the angular velocity sensor 6 after correcting motion blurring is converted into the amount of correction for motion blurring and is recorded on the moving-picture recording medium 21. If there is no instruction to correct motion blurring from the user, the detection result obtained from the angular velocity sensor 6 is directly converted into the amount of correction for motion blurring, and is recorded on the moving-picture recording medium 21. Accordingly, the amount of motion of a background generated by panning or tilting is recorded, together with the imaging result, on the recording medium.

Accordingly, in the imaging apparatus 1, the motions of the individual parts of an imaging result are corrected by using the motion of a background so that the relative motions of the individual parts with respect to the background can be detected. Thus, even if the background is moving due to panning or tilting, the motion of a subject can be detected, assuming that the background is still. As a result, the subject can be easily and reliably detected, and various processing operations can be executed.

In the imaging apparatus 1, in response to an instruction to play back a still image from the user, the still-image imaging result recorded on the still-image recording medium 16 is played back, and is decompressed by the still-image processing DSP 10 and is displayed on the display device 13 via the image processing DSP 8 and the D/A converter 11. Additionally, in response to play back a moving picture from the user, the moving-picture imaging result recorded on the moving-picture recording medium 21 is played back, and is decompressed by the moving-picture processing DSP 9 and is displayed on the display device 13 via the image processing DSP 8 and the D/A converter 11.

If an instruction to generate index images is issued by the user, the moving-picture imaging result recorded on the moving-picture recording medium 21 is played back and is decompressed by the moving-picture processing DSP 9. The moving-picture imaging result is then input into the image processing DSP 8, and motion vectors of the individual parts of the imaging result are detected in units of macroblocks. Then, the motion of the imaging apparatus 1 recorded on the moving-picture recording medium 21 is played back, and the motion vectors of the individual parts detected by the image processing DSP 8 are corrected by using the motion of the imaging apparatus 1, thereby detecting the relative motions of the individual parts with respect to the still background.

Also, in response to an instruction to perform an electronic zoom operation, the motions of the individual parts of the macroblocks of the imaging result detected by the image processing DSP 8 are corrected by using the motion of the imaging apparatus 1, thereby detecting the relative motions of the individual parts with respect to the still background.

As a result, in the imaging apparatus 1, the imaging result of a moving subject as if it were photographed in a still background can be obtained by simple processing, thereby improving the precision in detecting the subject. As a result, desired operations can be reliably performed.

More specifically, when generating index images, a sharp change in the motion of the subject is detected based on the relative motions of the individual parts of the imaging result so that scene changes can be detected. Frames associated with the detected scene changes are recorded as thumbnail images. As a result, index images are generated. According to the first embodiment, a subject can be precisely detected so that scene changes can be correctly detected, which is difficult to achieve when scene changes are detected by simply using inter-frame differences, and more specifically, scene changes are erroneously detected on the occurrence of a sharp change in a background. As a result, the precision in generating index images is improved, thereby enhancing the ease of operation.

When performing an electronic zoom operation, an area containing a photographed subject is detected from the imaging result recorded on the moving-picture recording medium 21 on the basis of the relative motions of the individual parts of the imaging result, and then, an image is generated by the electronic zoom operation performed on that area and is displayed on the display device 13. Accordingly, in the first embodiment, a desired subject can be reliably displayed by performing the electronic zoom operation.

According to the foregoing configuration of the first embodiment, the motion of the imaging apparatus 1 can be detected by a motion detector, such as the angular velocity sensor 6, and is recorded. The imaging result can be processed based on the information concerning the motion of the imaging apparatus 1. Thus, even if a background is moving due to panning or tilting, a subject can be detected easily and reliably, and as a result, various processing can be executed.

As the motion detector, the angular velocity sensor 6 is used so that the motion of the imaging apparatus 1 can be reliably detected. The angular velocity sensor 6 has a motion-blurring correcting mechanism. Accordingly, the configuration of the motion-blurring correction mechanism can be effectively utilized, thereby simplifying the overall configuration.

The information concerning the motion of the imaging apparatus 1 is played back, and the motions of the individual parts of an imaging result are corrected by using the motion of the imaging apparatus 1. Accordingly, the relative motions of the individual parts with respect to a background can be detected, and the imaging result of a moving subject as if it were photographed in a still background can be obtained by simple processing. Thus, the precision in detecting the subject can be improved, and the processing operations can be reliably executed.

More specifically, scene changes can be reliably detected based on the relative motions of the individual parts of an imaging result. As a result, thumbnail images can be generated as index images.

Additionally, an area containing a photographed subject is detected based on the relative motions of the individual parts of an imaging result, and then, the imaging result is processed by the electronic zoom operation based on the detected area. Thus, a desired subject can be reliably displayed by performing the electronic zoom operation.

Second Embodiment

In a second embodiment, the generation of index images in the imaging apparatus 1 is performed when imaging results are recorded. Additionally, in response to an instruction from the user, an electronic zoom operation is performed while moving-picture imaging results are being recorded. The imaging apparatus 1 of the second embodiment is the same as that of the first embodiment, except that the index-image generating processing and the electronic zoom processing are performed on imaging results output from the A/D converter 5 and motion information output from the camera control microcomputer 3 instead of imaging results and motion information played back from the moving-picture recording medium 21.

According to the second embodiment, advantages similar to those obtained by the first embodiment can be achieved.

Third Embodiment

In a third embodiment, the optical system is controlled by using the relative motions of the individual parts of an imaging result with respect to a background, which are detected in the first or second embodiment. The imaging apparatus 1 in the third embodiment is the same as that of the first embodiment, except that the elements related to the controlling of the optical system are different from those in the first embodiment, and thus, an explanation is given by using the imaging apparatus 1 shown in FIG. 2.

Figure 11:
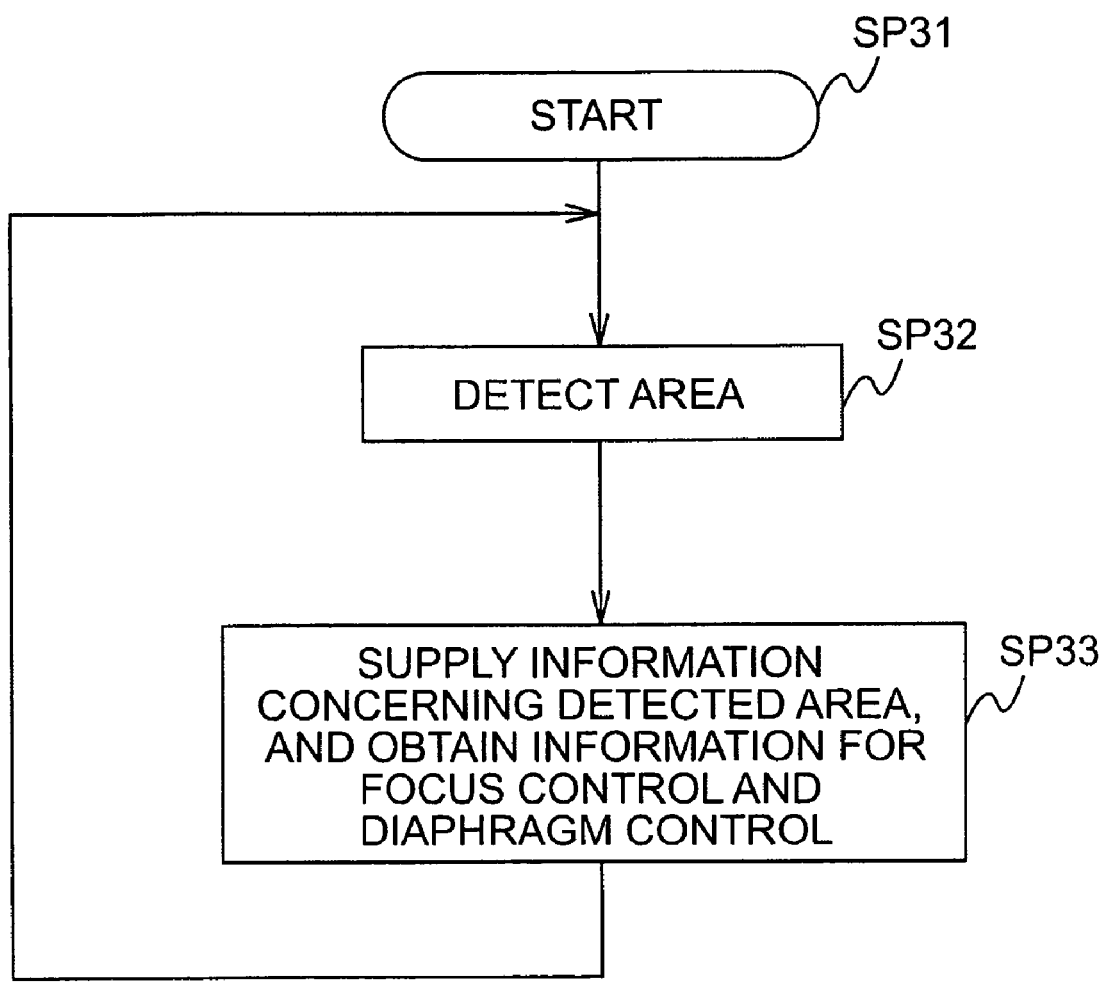
FIG. 11 is a flowchart illustrating the processing performed by the central processing microcomputer of an imaging apparatus according to a third embodiment of the present invention.

In the third embodiment, in response to an instruction to photograph moving pictures from the user, the central processing microcomputer 7 starts processing indicated by the flowchart in FIG. 11. The central processing microcomputer 7 proceeds from step SP31 to SP32. In step SP32, the central processing microcomputer 7 detects an area containing a subject which is being photographed, as in the first embodiment, by using imaging results output from the A/D converter 5 and motion information output from the camera control microcomputer 3 instead of imaging results and motion information played back from the moving-picture recording medium 21.

Then, in step SP33, the central processing microcomputer 7 supplies information concerning the detected area to the image processing DSP 8, and returns to step SP32 to process the subsequent frame.

The image processing DSP 8 obtains information concerning necessary for focus control and diaphragm control from the detected area and supplies the information to the camera control microcomputer 3. The information necessary for focus control is, for example, the signal level of high frequency components in the detected area, and the information necessary for diaphragm control is, for example, the luminance level of the imaging result detected in that area.

Accordingly, in the third embodiment, the area containing the photographed subject is detected from the imaging result based on the relative motions of the individual parts of the imaging result with respect to the background, which is detected by using the output from a motion-blurring sensor, and the optical system is controlled based on the detected area. With this configuration, optimal conditions for photographing a desired subject can be set, thereby enhancing the ease of operation.

More specifically, when focus control is performed as the control of the optical system, a desired subject can be accurately focused even if a background is moving due to panning or tilting.

When diaphragm control is performed as the control of the optical system, a desired subject can be photographed while sufficiently ensuring the grayscale of the desired subject even if a background is moving due to panning or tilting.

Modified Examples

In the second embodiment, the electronic zoom operation is performed during the recording operation. Alternatively, an optical zoom operation may be performed during the recording operation.

Instead of the angular velocity sensor 6, an acceleration sensor may be used as the motion detector for detecting the motion of the imaging apparatus 1.

The angular velocity sensor 6 for correcting motion blurring is also used as a sensor for detecting the motion of the imaging apparatus 1. However, a dedicated sensor may be provided.

In the foregoing embodiments, the motion of the imaging apparatus 1 is detected by using the output from the sensor. Alternatively, there are other approaches to detecting the motion of the imaging apparatus 1. For example, motion vectors detected in the individual macroblocks of an imaging result may be used, or a movable mechanism for performing, for example, panning or tilting, may be used for detecting the motion of the imaging apparatus 1.

In the foregoing embodiments, the present invention is used for the imaging apparatus 1 having a motion-blurring correcting mechanism. However, the present invention is applicable to imaging apparatuses without a motion-blurring correcting mechanism.

Additionally, although in the above-described embodiments the generation of index images, the electronic zoom operation, and the controlling of the optical system are performed, the present invention is applicable to, for example, monitoring cameras for tracing moving objects, or imaging apparatuses disposed separately from a recording system.

It should be understood by those skilled in the art that various modifications, combinations, sub-combinations and alterations may occur depending on design requirements and other factors insofar as they are within the scope of the appended claims or the equivalents thereof.

The invention claimed is:
1. An imaging apparatus comprising:
an imaging device for obtaining an imaging result;
an optical system for forming an optical image on an imaging plane of the imaging device;
first motion detection means for detecting a movement of the imaging apparatus and for outputting a detection result;
second motion detection means for detecting motions of individual parts of the imaging result from the imaging result;

motion correction means for correcting the motions of the individual parts of the imaging result detected by the second motion detection means by using the detection result to detect relative motions of the individual parts of the imaging result with respect to a background; and image processing means for generating index thumbnail images by detecting discontinuous motions between a first image frame and a second image frame subsequent to the first image frame, wherein the detecting discontinuous motions includes accumulatively adding the relative movements of the individual parts of the imaging result with respect to the background for the respective first and second image frames and determining a difference between the accumulations for the respective first and second image frames.

2. The imaging apparatus according to claim 1, wherein the first motion detection means includes a sensor for detecting an acceleration or an angular velocity of the imaging apparatus.

3. The imaging apparatus according to claim 2, further comprising motion-blurring correction means for correcting the imaging result for motion blurring based on the detection result.

4. The imaging apparatus according to claim 1, further comprising:
    subject detection means for detecting an area including a photographed subject from the imaging result recorded on the recording medium based on the relative movements of the individual parts of the imaging result; and
    image processing means for generating an image by performing an electronic zoom operation on the detected area based on a detection result obtained by the subject detection means.

5. An imaging apparatus for obtaining an imaging result, comprising:
    an imaging device for obtaining an imaging result;
    an optical system for forming an optical image on an imaging plane of the imaging device;
    first motion detection means for detecting a movement of the imaging apparatus and for outputting a detection result;
    second motion detection means for detecting movements of individual parts of the imaging result;
    motion correction means for correcting the movements of the individual parts of the imaging result using the detection result to detect relative movements of the individual parts of the imaging result with respect to a background; and
    image processing means for generating index thumbnail images by detecting discontinuous motions between a first image frame and a second image frame subsequent to the first image frame, wherein the detecting discontinuous motions includes accumulatively adding the relative movements of the individual parts of the imaging result with respect to the background for the respective first and second image frames and determining a difference between the accumulations for the respective first and second image frames.

6. The imaging apparatus according to claim 5, wherein the first motion detection means includes a sensor for detecting an acceleration or an angular velocity of the imaging apparatus.

7. The imaging apparatus according to claim 6, further comprising motion-blurring correction means for correcting the imaging result for motion blurring based on the detection result.

8. The imaging apparatus according to claim 5, further comprising:
    subject detection means for detecting an area including a photographed subject from the imaging result based on the relative movements of the individual parts of the imaging result; and
    control means for controlling the optical system based on a detection result obtained by the subject detection means.

9. The imaging apparatus according to claim 8, wherein the control means performs focus control on the optical system.

10. The imaging apparatus according to claim 8, wherein the control means performs diaphragm control on the optical system.

11. The imaging apparatus according to claim 5, further comprising:
    subject detection means for detecting an area including a photographed subject from the imaging result based on the relative movements of the individual parts of the imaging result; and
    image processing means for generating an image by performing an electronic zoom operation on the detected area based on a detection result obtained by the subject detection means.

12. A method for processing an imaging result obtained from an imaging apparatus that records the imaging result on a recording medium, the method comprising:
    detecting a movement of the imaging apparatus and outputting a detection result;
    recording the detection result, together with the imaging result, on the recording medium;
    detecting movements of individual parts of the imaging result from the imaging result recorded on the recording medium;
    correcting the movements of the individual parts of the imaging result using the detection result recorded on the recording medium to detect relative movements of the individual parts of the imaging result with respect to a background; and
    generating index thumbnail images by detecting discontinuous motions between a first image frame and a second image frame subsequent to the first image frame, wherein the detecting discontinuous motions includes accumulatively adding the relative movements of the individual parts of the imaging result with respect to the background for the respective first and second images frames and determining a difference between the accumulations for the respective first and second image frames.

13. A method for processing an imaging result obtained from an imaging apparatus, the method comprising:
    detecting a movement of the imaging apparatus and outputting a detection result;
    detecting movements of individual parts of the imaging result; and
    correcting the movements of the individual parts of the imaging result using the detection result to detect relative movements of the individual parts of the imaging result with respect to a background; and
    generating index thumbnail images by detecting discontinuous motions between a first image frame and a second image frame subsequent to the first image frame, wherein the detecting discontinuous motions includes accumulatively adding the relative movements of the individual parts of the imaging result with respect to the background for the respective first and second images frames and determining a difference between the accumulations for the respective first and second image frames.

14. An imaging apparatus for obtaining an imaging result, comprising:

an imaging device operable to obtain an imaging result;

an optical system operable to form an optical image on an imaging plane of the imaging device;

a first motion detector operable to detect a movement of the imaging apparatus and to output a detection result;

a second motion detector operable to detect movements of individual parts of the imaging result;

a motion correction unit operable to correct the movements of the individual parts of the imaging result using the detection result to detect relative movements of the individual parts of the imaging result with respect to a background; and an image processing unit operable to generate index thumbnail images by detecting discontinuous motions between a first image frame and a second image frame subsequent to the first image frame, wherein the detecting discontinuous motions includes accumulatively adding the relative movements of the individual parts of the imaging result with respect to the background for the respective first and second images frames and determining a difference between the accumulations for the respective first and second image frames.

15. The imaging apparatus according to claim 1, further comprising scene change detecting means for generating scene change information on the basis of a change in the relative motions of the individual parts of the imaging result.

16. An image processing apparatus comprising: an imaging unit to obtain an optical image and to convert the optical image to imaging results; a first motion detector to detect a movement of the imaging apparatus and output a detection result representative of movement of a background; a second motion detector to detect a motion or motions of an individual part or parts of the imaging result from the imaging result; and a computer unit to correct the motion or motions of the individual part or parts of the imaging result detected by the second motion detector by use of the detection result from the first motion detector so as to provide a relative motion or motions of the individual part or parts of the imaging result with respect to the background, and to generate index thumbnail images by detecting discontinuous motions between a first image frame and a second image frame subsequent to the first image frame, wherein the detecting discontinuous motions includes accumulatively adding the relative motion or motions of the individual part or parts of the imaging result with respect to the background for the respective first and second images frames and determining a difference between the accumulations for the respective first and second image frames.

* * * * *